(12) United States Patent
Nelson et al.

(10) Patent No.: US 11,267,440 B2
(45) Date of Patent: Mar. 8, 2022

(54) USER IDENTIFICATION SYSTEMS AND METHODS

(71) Applicant: Ford Global Technologies, LLC, Dearborn, MI (US)

(72) Inventors: Zachary David Nelson, Dearborn, MI (US); Shane Elwart, Dearborn, MI (US); Bibhrajit Halder, Dearborn, MI (US); Jonathan Thomas Mullen, Dearborn, MI (US); Scott Vincent Myers, Dearborn, MI (US); Tory Smith, Dearborn, MI (US); Walter Joseph Talamonti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 831 days.

(21) Appl. No.: 16/071,207

(22) PCT Filed: Jan. 19, 2016

(86) PCT No.: PCT/US2016/013903
§ 371 (c)(1),
(2) Date: Jul. 19, 2018

(87) PCT Pub. No.: WO2017/127053
PCT Pub. Date: Jul. 27, 2017

(65) Prior Publication Data
US 2021/0197763 A1     Jul. 1, 2021

(51) Int. Cl.
*B60R 25/24*           (2013.01)
*E05B 81/64*           (2014.01)
*B60R 16/037*          (2006.01)
*B60R 25/01*           (2013.01)

(52) U.S. Cl.
CPC ............ *B60R 25/24* (2013.01); *B60R 16/037* (2013.01); *B60R 25/01* (2013.01); *E05B 81/64* (2013.01)

(58) Field of Classification Search
CPC ....... B60R 25/24; B60R 16/037; B60R 25/01; E05B 81/64
See application file for complete search history.

(56) References Cited

U.S. PATENT DOCUMENTS

| | | | |
|---|---|---|---|
| 9,086,281 B1* | 7/2015 | Thiagarajan | G01C 21/10 |
| 9,707,911 B1* | 7/2017 | Myers | H04W 4/70 |
| 10,302,434 B2* | 5/2019 | Chowdhary | G01C 21/20 |
| 2013/0099892 A1* | 4/2013 | Tucker | H04W 4/80 |
| | | | 340/5.61 |
| 2013/0138388 A1* | 5/2013 | Jain | G06Q 30/0201 |
| | | | 702/141 |
| 2016/0129916 A1* | 5/2016 | Olsen | H04L 67/12 |
| | | | 701/36 |

* cited by examiner

*Primary Examiner* — Thomas D Alunkal
(74) *Attorney, Agent, or Firm* — Brandon Hicks; Eversheds Sutherland (US) LLP (57) ABSTRACT

Example user identification systems and methods are described. In one implementation, a method determines a first step pulse associated with a user carrying a key fob and detects a user device proximate the key fob. The method further identifies a second step pulse measured by the user device and determines whether the first and second step pulses match. If the step pulses match, the user carrying the key fob is identified as the owner of the user device.

19 Claims, 5 Drawing Sheets

USER IDENTIFICATION SYSTEMS AND METHODS

TECHNICAL FIELD

The present disclosure relates to systems and methods that identify a user based on identifying matching step information generated by two different devices.

BACKGROUND

Many vehicles offer additional driver comfort and personalization features that can be provided to the driver if the driver is identified before they enter the vehicle. These features include, for example, welcome displays projected from the vehicle's side mirrors, seat adjustment, personalization of a heads up display, and personalized climate control settings.

Some existing systems attempt to identify a driver before they enter the vehicle by detecting a key fob proximate the vehicle. However, multiple drivers may share the same key fob, which prevents the vehicle from determining which driver is approaching the vehicle. Therefore, these existing systems cannot accurately identify the person carrying the key fob and cannot properly set the correct driver comfort and personalization features.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein compares step pulses measured by multiple devices to identify a particular user. In some embodiments, a user device measures the step pulse of a user carrying the user device and broadcasts the step pulse information to other devices in the area using, for example, Bluetooth Low Energy (BLE) wireless communication system. When a second device, such as a key fob, receives the broadcast step pulse information, the second device compares the received step pulse information with a second set of step pulse information measured by the second device. If both sets of step pulse information are the same, then the system determines that the same person is carrying both devices. If the user's identity is stored in one of the two devices, the other device can learn that identity since both devices are being carried by the same person.

Particular examples discussed herein refer to matching step information from a key fob for a vehicle with another user device. In alternate embodiments, the described systems and methods are used to match step information from any two or more devices carried by a user, which may or may not include a key fob. For example, in a particular embodiment, the described systems and methods can match step information between a smartphone and a smart watch, or similar device.

Various references are made herein to "steps," "step information," and "step pulse". All three of these terms are used interchangeably herein and refer to information regarding a user's walking pattern or gait. In particular, the user's walking pattern may include heel strike information, temporal spacing between steps, and the like.

Figure 1:
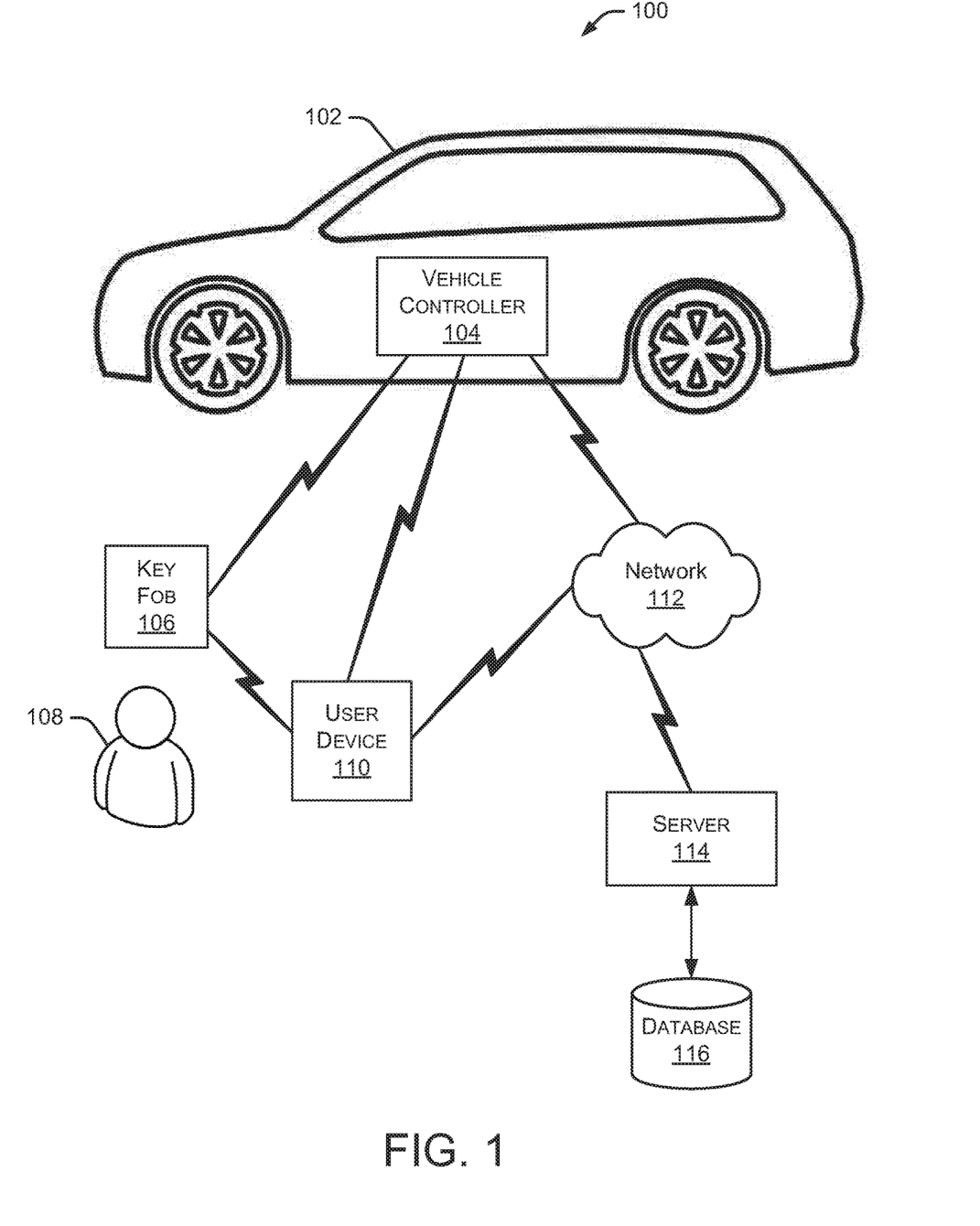
FIG. 1 is a block diagram depicting an example environment capable of implementing the systems and methods discussed herein.

FIG. 1 is a block diagram depicting an example environment 100 capable of implementing the systems and methods discussed herein. A vehicle 102 includes a vehicle controller 104 that controls various vehicle functions, such as welcome displays projected from the vehicle's side mirrors (or projected from other vehicle locations), locking/unlocking doors, setting climate control parameters, setting vehicle navigation parameters, setting vehicle seat adjustments, setting heads up display parameters, setting entertainment system parameters, other personalization settings, and the like. The welcome display can be projected inside the vehicle, on the ground proximate the vehicle, and so forth. Vehicle 102 may be any type of car, truck, van, bus, SUV (sport utility vehicle) or other vehicle having any type of vehicle controller 104. Vehicle controller 104 communicates with a key fob 106 (carried and/or operated by a user 108) and one or more user devices 110 (which may or may not be carried and/or operated by user 108). User 108 is, for example, a driver or passenger of vehicle 102.

In some embodiments, vehicle controller 104 detects key fob 106 and/or user devices 110 when they are within a predetermined distance of vehicle 102. In some implementations, vehicle controller 104 communicates with key fob 106 and/or user devices 110 using Bluetooth and/or Bluetooth Low Energy wireless communication system. Key fob 106 is any portable device capable of communicating with vehicle controller 104. User devices 110 include any portable device capable of communicating with vehicle controller 104, such as a smartphone, a portable computing device, a tablet computer, a smart watch, smart glasses or other wearable devices. As discussed herein, user device 110 may broadcast Bluetooth Low Energy signals that are received by Key fob 106.

Vehicle controller 104 may periodically communicate with a data communication network 112, such as the Internet or other network. For example, vehicle controller 104 may communicate with a server 114 via network 112. Server 114 can access data from a database 116, which includes user profile information, vehicle history information, user device information, and the like. This accessed data is communicated to vehicle controller 104 to assist the vehicle controller in determining how to configure various driver comfort and personalization settings. Further, vehicle controller 104 may communicate data, such as user profile changes, and other information to server 114 for storage in database 116. In some embodiments, vehicle controller 104 stores some or all of the data that is also stored in database 116.

In some embodiments, server 114 may provide other information to vehicle controller 104, such as online map information, updated vehicle control information, and the like. In other implementations, vehicle controller 104 may communicate with other servers or data sources (not shown) via network 112. These other servers or data sources can provide any type of data from any number of data providers.

In the example embodiment 100 shown in FIG. 1, one key fob 106 is shown along with one user device 110. In other embodiments, multiple key fobs 106 are used to access the same vehicle 102. For example, two different users 108 may frequently drive vehicle 102. In this situation, each of the different users 108 have their own key fob 106. Each vehicle access device 106 has its own unique code or identifier such that vehicle controller 104 can distinguish between the two key fobs 106. In some embodiments, multiple user devices 110 are located within embodiment 100 and carried by any number of users 108. Each user device 110 has a unique code or identifier such that key fobs 106 within broadcast range of user device 110 can uniquely identify the user device 110 broadcasting the signal. For example, the broadcast signal may include a unique device identifier associated with user device 110. The unique device identifier can be used to identify an owner or user of the device. In some implementations, the unique device identifier is associated with the device's Bluetooth MAC address. In some embodiments, the broadcast signal also includes timestamp information related to a step pulse (i.e., the temporal spacing between heel strikes). The broadcast signal may further include accelerometer data before the heel strike and the accelerometer data after the heel strike.

Figure 2:
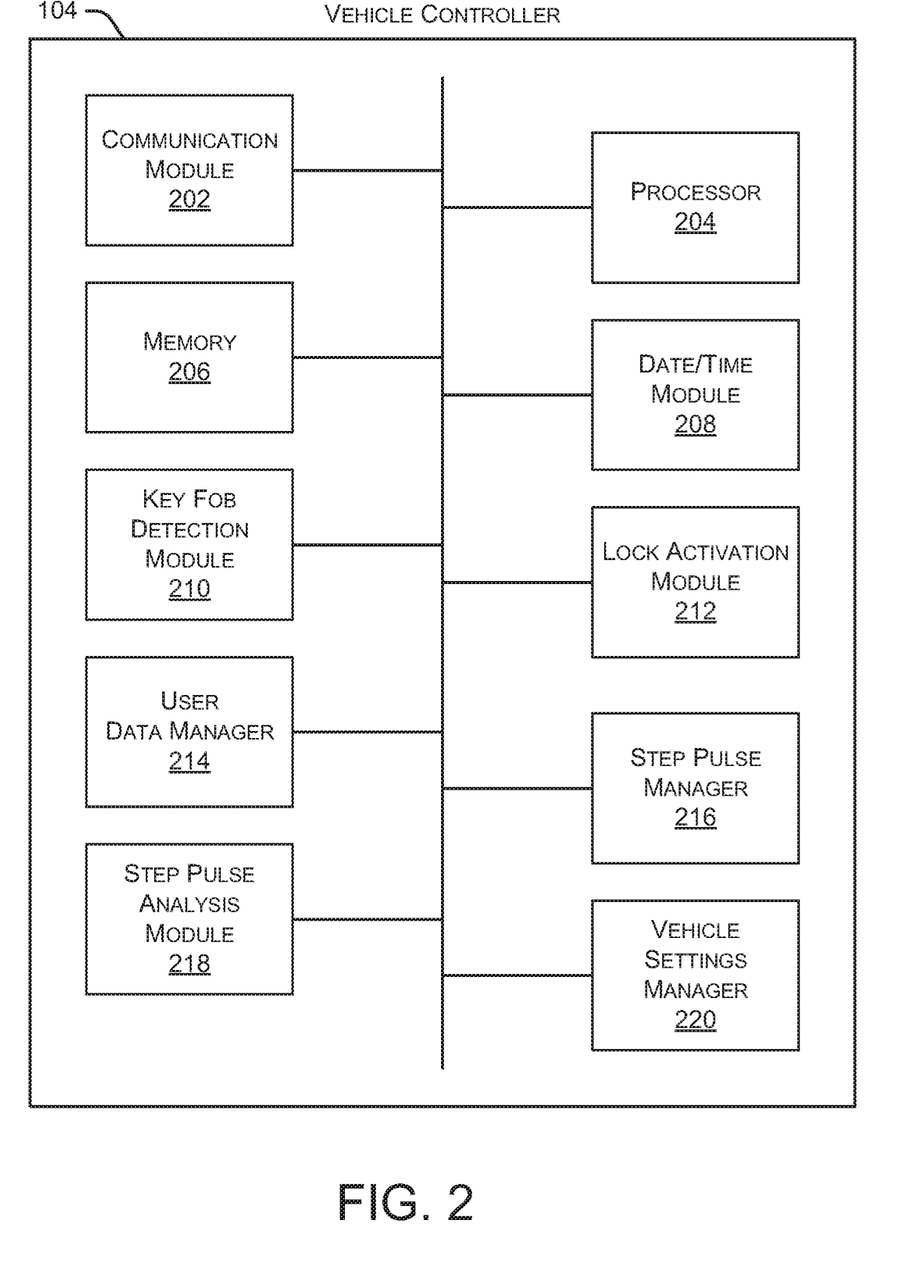
FIG. 2 is a block diagram depicting an embodiment of a vehicle controller.

FIG. 2 is a block diagram depicting an embodiment of vehicle controller 104. As shown in FIG. 2, vehicle controller 104 includes a communication module 202, a processor 204, and a memory 206. Communication module 202 allows vehicle controller 104 to communicate with other systems or components, such as key fob 106, user device 110, network 112, server 114, and the like. Additionally, communication module 202 may communicate with other systems or devices in vehicle 102 via a bus, such as a CAN (controller area network) bus. For example, communication module 202 may communicate with a vehicle navigation system, an infotainment system, a climate control system, a seat adjustment system, a door lock/unlock system, and the like. The door lock/unlock system may lock or unlock any vehicle access point, such as a vehicle door, trunk, tailgate, sliding door, hatch, hood, or gas tank refill door. Processor 204 executes various instructions to implement the functionality provided by vehicle controller 104. Processor 204 may include any type of general purpose or special purpose processor for executing program code or instructions. Memory 206 stores these instructions as well as other data used by processor 204 and other modules contained in vehicle controller 104. Additionally, memory 206 may store user-specific information, such as user profile information, previous user behavior, and the like.

Vehicle controller 104 also includes a date/time module 208 that maintains a current time, date, and day of the week. In some embodiments, this time and date information is linked to specific user activities and stored for future reference in determining the user's future preferences. A key fob detection module 210 identifies signals from one or more key fobs 106. In some embodiments, the signal received from key fob 106 includes an identity of the person currently carrying the key fob. Using this identity from key fob 106, vehicle controller 104 can set various vehicle settings and parameters based on the identified user's profile information.

A lock activation module 212 in vehicle controller 104 is connected to one or more lock mechanisms in vehicle 102 and is capable of sending lock instructions and unlock instructions to each lock mechanism in the vehicle. Vehicle controller 104 further includes user data manager 214 that receives, manages, and stores various user data, such as user profile information, user preferences, user activity history, and the like. A step pulse manager 216 receives, manages, and stores various step pulse information associated with one or more users of vehicle 102. The stored step pulse information is used, for example, to identify a user approaching vehicle 102 based on current step pulse data received from key fob 106 or user device 110. A step pulse analysis module 218 is capable of analyzing various user step information and comparing multiple sets of step pulse information to determine whether the step pulse information is associated with the same user. A vehicle settings manager 220 manages and controls various vehicle settings, such as settings for a vehicle navigation system, an infotainment system, a climate control system, a seat adjustment system, a door lock/unlock system, and the like.

Figure 3:
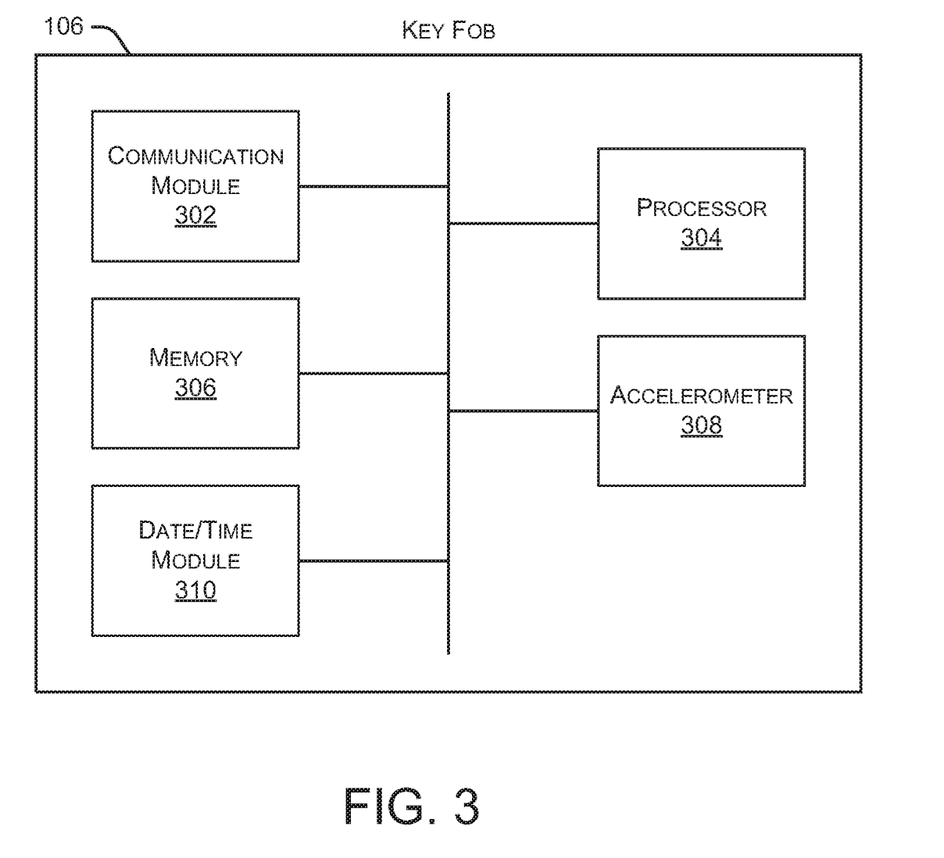
FIG. 3 is a block diagram depicting an embodiment of a key fob.

FIG. 3 is a block diagram depicting an embodiment of key fob 106. As shown in FIG. 3, key fob 106 includes a communication module 302, a processor 304, and a memory 306. Communication module 302 allows key fob 106 to communicate with other systems or components, such as vehicle controller 104, user device 110, and the like. Processor 304 executes various instructions to implement the functionality provided by key fob 106. Processor 304 may include any type of general purpose or special purpose processor for executing program code or instructions. Memory 306 stores these instructions as well as other data used by processor 304 and other modules contained in key fob 106. Additionally, memory 306 may store user-specific information, such as user identification information, and the like.

Key fob 106 also includes an accelerometer 308 that measures movement and acceleration forces. In particular, accelerometer 308 detects a user's step (e.g., a user's heel strike on a floor or other solid surface). A date/time module 310 maintains a current day and time. In operation, key fob 106 uses date/time module 310 to associate a timestamp with each user step detected using accelerometer 308. These timestamps allow key fob 106 to help determine the step pulse of a user carrying key fob 106. Processor 304 executes one or more algorithms that compare the step pulse of the user carrying key fob 106 with another step pulse received from user device 110. If the comparison determines that the step pulses match, then processor 304 generates a signal (or other identifier) indicating that key fob 106 and user device 110 are currently being carried by the same user.

Although FIG. 3 depicts an embodiment of key fob 106, similar components may be included in embodiments of user device 110. For example, user device 110 may include a communication module 302, a processor 304, a memory 306, an accelerometer 308, and a date/time module 310 that operate substantially as described above. User device 110 may also include other components not shown in FIG. 3 that complement the above-described operation or that perform different functions not discussed herein.

Figure 4:
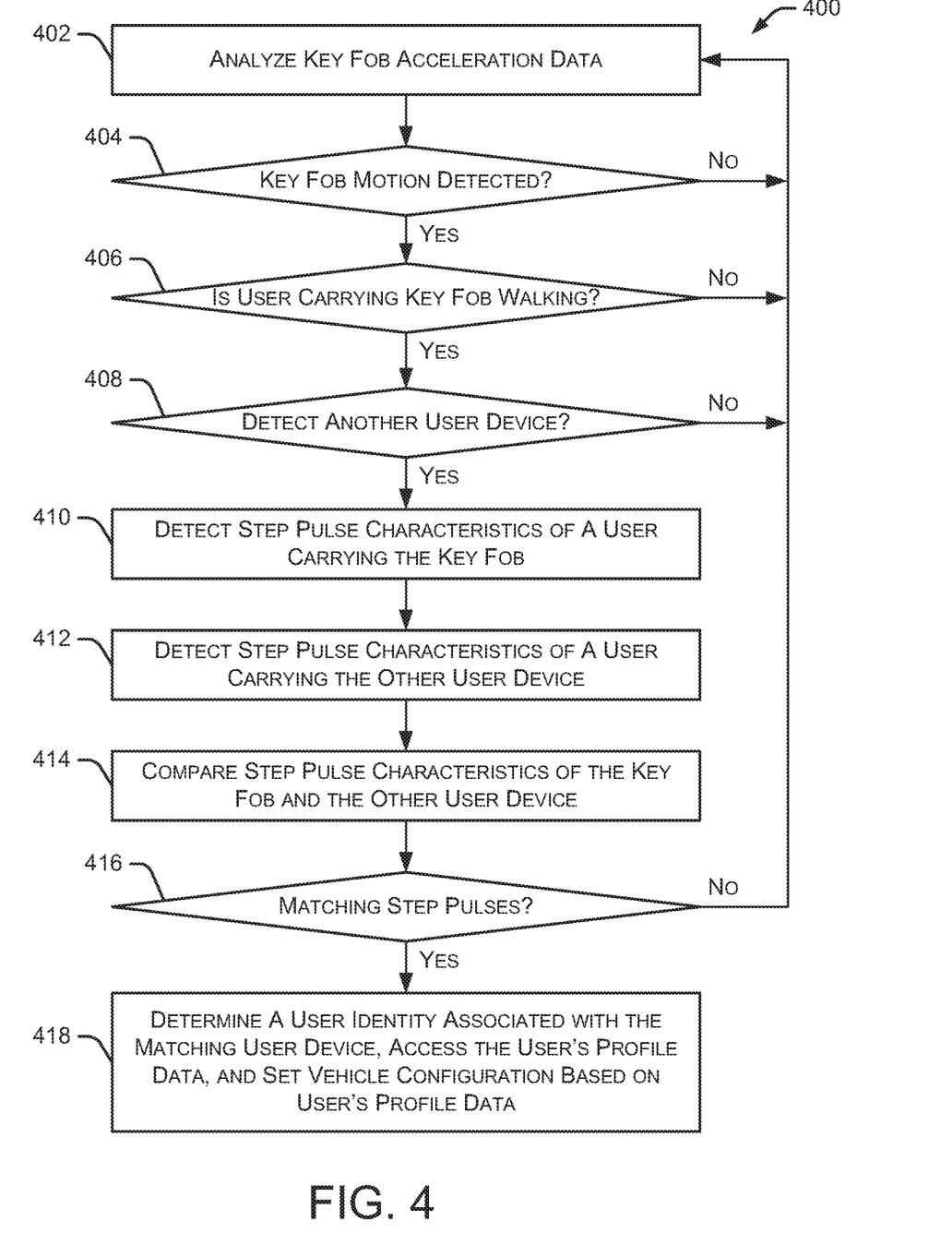
FIG. 4 is a flow diagram depicting an embodiment of a method for determining a user identity based on multiple step pulses.

FIG. 4 is a flow diagram depicting an embodiment of a method 400 for determining a user identity based on multiple step pulses. Initially, method 400 analyzes a key fob's acceleration data at 402, such as analyzing data generated by an accelerometer within the key fob. If key fob motion is detected, based on the acceleration data, at 404, the method continues to 406 to determine whether a user carrying the key fob is walking. If the user carrying the key fob is walking, the key fob attempts to detect another user device at 408. The key fob can detect the other user device if it is within a particular distance of the key fob. The particular distance is based on the range of the communication system used by the other user device to communicate with key fobs and other devices. For example, when using the Bluetooth Low Energy wireless communication system, the approximate communication range is 20-300 feet.

If another user device is detected at 408, method 400 continues by detecting step pulse characteristics of a user carrying the key fob at 410. As discussed herein, the step pulse characteristics may include heel strike information identified by an accelerometer and timestamps associated with the heel strikes to determine a temporal spacing of the heel strikes. Method 400 also detects step pulse characteristics of a user carrying the other user device at 412. In some embodiments the step pulse characteristics of the other user device are included in the broadcast data generated by the other user device.

The method continues at 414 as the key fob compares the step pulse characteristics of the key fob with the step pulse characteristics of the other user device. If the step pulses do not match at 416, then method 400 returns to 402 to continue analyzing received step pulse information. The non-matching step pulses indicate that different people are carrying the key fob and the other user device. If the step pulses match at 416, the method continues at 418 as the key fob determines a user identity associated with the matching user device. Since the two step pulses match, the same person is carrying both the key fob and the other user device. Therefore, the key fob obtains the user identity from the other user device. In some embodiments, the key fob communicates the user identity to the vehicle which then accesses the user's profile data and sets the vehicle's configuration based on the user profile data. As discussed herein, the vehicle's configuration includes, for example, climate control parameters, vehicle navigation parameters, vehicle seat adjustments, heads up display parameters, entertainment system parameters, and the like.

In particular embodiments, multiple step pulses are detected as well as the elapsed time between steps. This elapsed time between steps is one of the factors used in determining whether two step pulses match.

In some embodiments, if matching step pulses are identified, the other user device's unique identifier as well as the user identity associated with the other user device are stored in the key fob for future reference.

In some embodiments, user profile information is stored in vehicle 102 (e.g., stored within vehicle controller 104, server 114, or another system). In these embodiments, key fob 106 can simply communicate the unique identifier associated with the other user device to vehicle 102, which then looks up the user profile information based on the unique identifier. In other embodiments, user profile information is stored in key fob 106. In these embodiments, the user profile information may be communicated from key fob 106 to vehicle 102.

Figure 5:
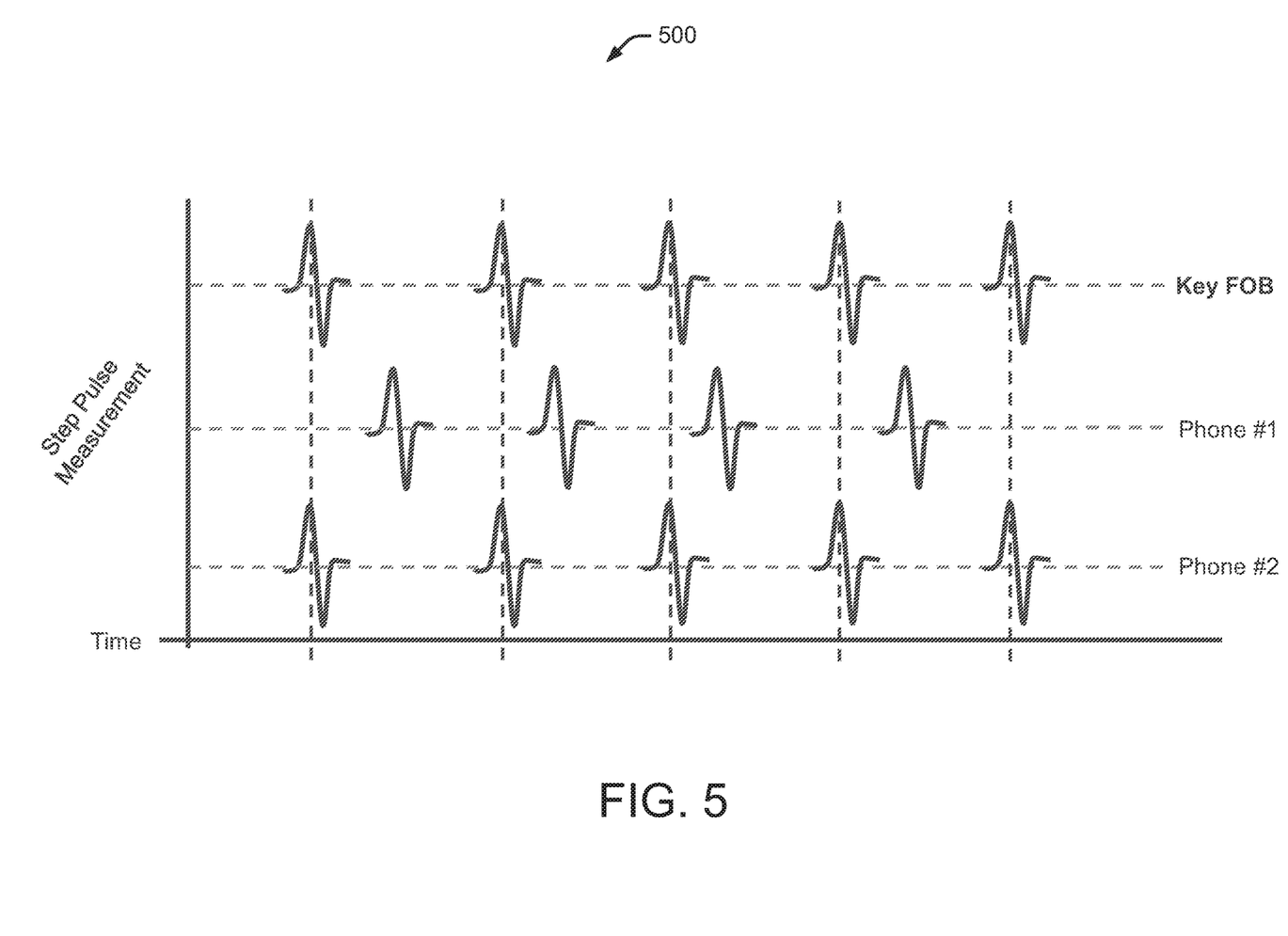
FIG. 5 illustrate example step pulse data associated with a key fob and other user devices.

FIG. 5 illustrates example step pulse data 500 associated with a key fob and other user devices. Three sets of step pulse data are shown: key fob data, phone #1 (i.e., a first user device), and phone #2 (i.e., a second user device). The step pulse data associated with the key fob and phone #2 have the same pulse characteristics and the same temporal relationship. Therefore, the key fob and phone #2 are said to have matching step pulse characteristics, and are both currently carried by the same person.

In some embodiments, when comparing the step pulses from two different devices, the described systems and methods compare the timestamps associated with consecutive heel strikes to be sure the timestamps align temporally. In other embodiments, the systems and methods compare the timestamps as well as the characteristics of the step pulse waveform, such as the magnitude of the step pulse waveform. The waveform characteristics may vary depending on the location of the device being carried. For example, a device carried in a pocket may generate different waveform characteristics from when the device is carried in a user's hand. Thus, in the described systems and methods, a device may broadcast step pulse information that identifies how (or where) the device is being carried.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   determining a first step pulse associated with a user carrying a key fob;
   detecting a user device proximate the key fob;
   determining, at the user device, a second step pulse;
   broadcasting, at the user device, information related to the second step pulse into an area proximate the user device;
   determining, using one or more processors, whether the first and second step pulses match; and
   responsive to determining matching step pulses, identifying the user carrying the key fob as the owner of the user device.

2. The method of claim 1, further comprising accessing a user profile associated with the identified user, wherein the user profile is associated with a vehicle.

3. The method of claim 2, further comprising unlocking at least one vehicle access point based on the user profile.

4. The method of claim 3, wherein the vehicle access point is one of a vehicle door, a trunk, a tailgate, a sliding door, a hatch, a hood and a gas tank refill door.

5. The method of claim 2, further comprising setting at least one vehicle configuration based on the user profile.

6. The method of claim 5, wherein the vehicle configuration is one of a radio station setting, a preferred climate control setting, a seat position setting, a mirror setting, vehicle navigation settings, personalization settings and a welcome display projected in or around the vehicle.

7. The method of claim 1, wherein the user device for measuring the second step pulse is one of a smartphone, a portable computing device and a smart watch.

8. The method of claim 1, wherein the first step pulse identifies temporal spacing between consecutive heel strikes of the user carrying the key fob.

9. The method of claim 1, wherein the broadcast information relating to the second step pulse is received at the key fob or a vehicle associated with the key fob.

10. The method of claim 1, wherein the key fob determines whether the first and second step pulses match.

11. The method of claim 1, wherein a vehicle controller in a vehicle associated with the key fob determines whether the first and second step pulses match.

12. A method comprising:
    determining a first step pulse associated with a user carrying a key fob;
    determining, at a user device associated with the user, a second step pulse;
    receiving a broadcast into an area proximate the user device from the user device proximate the key fob, the received broadcast including a second step pulse measured by the user device and an identification of the user carrying the user device;
    comparing, using one or more processors, the first step pulse and the second step pulse to determine whether the first step pulse and the second step pulse match; and
    responsive to determining that the first step pulse and the second step pulse match, identifying the user carrying the key fob based on the received identification of the user carrying the user device.

13. The method of claim 12, further comprising accessing a user profile associated with the identified user, wherein the use profile is associated with a vehicle.

14. The method of claim 13, further comprising setting at least one vehicle configuration based on the user profile.

15. The method of claim 14, wherein the vehicle configuration is one of a radio station setting, a preferred climate control setting, a seat position setting, a mirror setting, vehicle navigation settings, personalization settings and a welcome display projected in or around the vehicle.

16. The method of claim 12, wherein the first step pulse identifies temporal spacing between consecutive heel strikes of the user carrying the key fob.

17. The method of claim 12, wherein a vehicle controller in a vehicle associated with the key fob receives information associated with the first and second step pulses.

18. An apparatus carried by a user, the apparatus comprising:
    an accelerometer configured to identify a first step pulse associated with the user;
    a communication module configured to receive a broadcast into an area proximate the user device from a user device proximate the apparatus, the received broadcast including information associated with a second step pulse determined at the user device and an identification of a second user carrying the user device; and
    a processor coupled to the accelerometer and the communication module, the processor configured to compare the first step pulse and the second step pulse to determine whether the first step pulse and the second step pulse match, the processor further configured to identify the user based on the identification of the second user responsive to determining that the first step pulse and the second step pulse match.

19. The apparatus of claim 18, wherein the communication module is further configured to communicate the identity of the user to a vehicle associated with the apparatus.

* * * * *